June 14, 1960 J. J. CURRY ET AL 2,940,492
FIBER-GLASS REINFORCED PERCUSSIVE TOOL HANDLE
Filed July 22, 1955 2 Sheets-Sheet 2
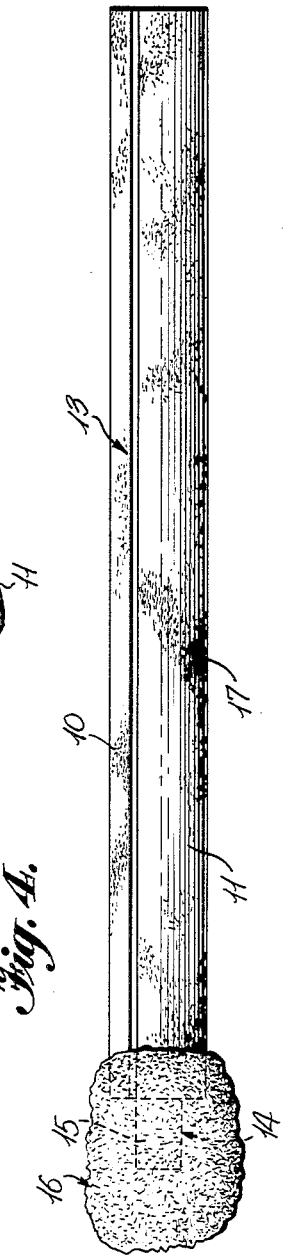
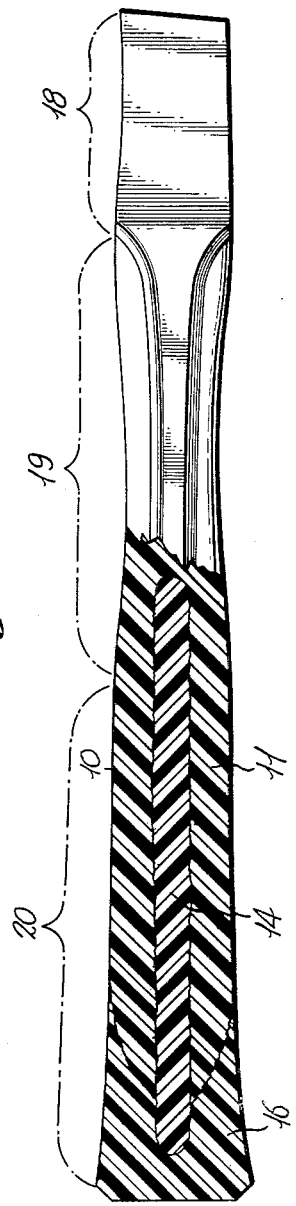
INVENTOR
John J. Curry
BY
Mason, Fenwick & Lawrence
ATTORNEYS

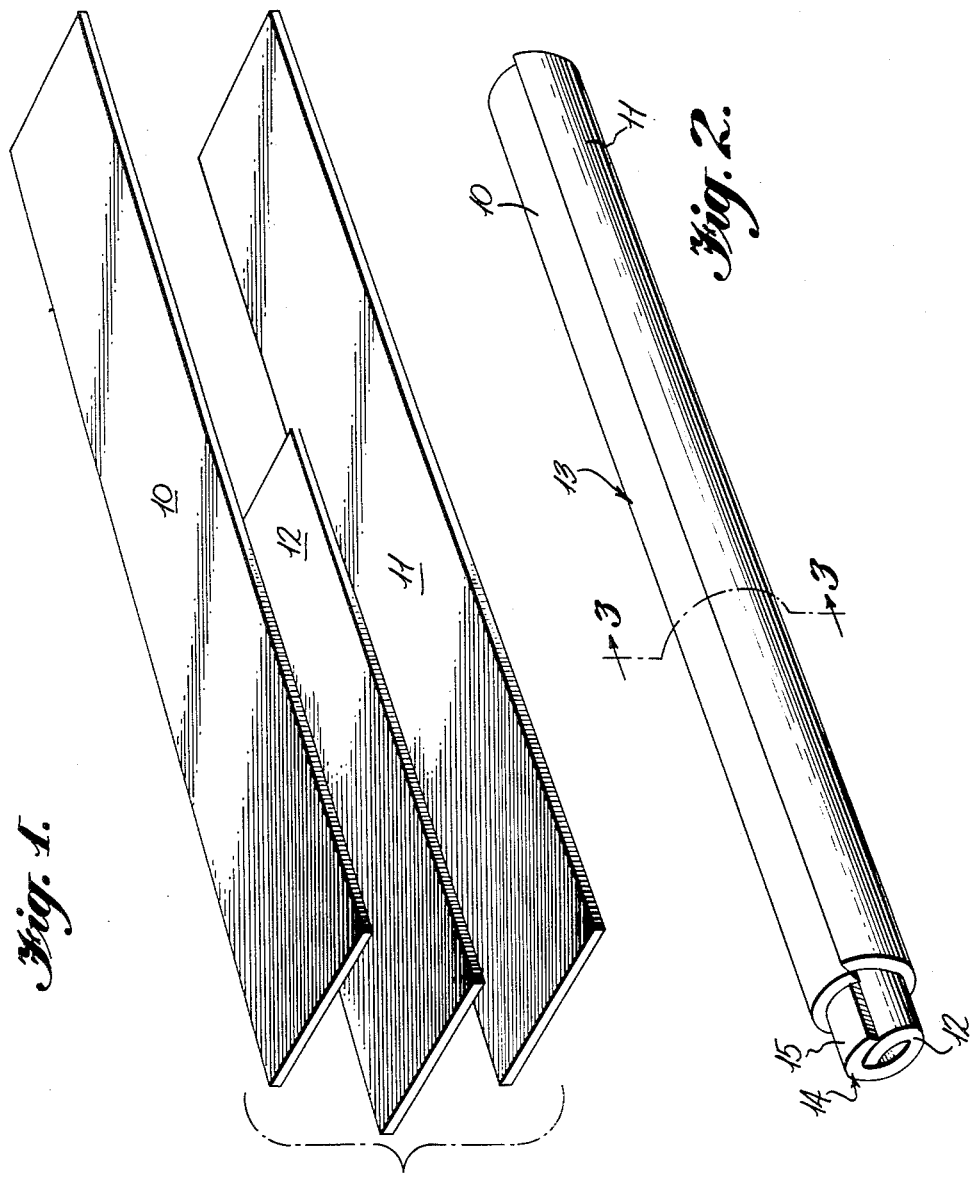

United States Patent Office 2,940,492
Patented June 14, 1960

2,940,492

FIBER-GLASS REINFORCED PERCUSSIVE TOOL HANDLE

John J. Curry and Robert C. Watson, Philadelphia, Pa., assignors, by direct and mesne assignments, to Fayette R. Plumb, Inc., Philadelphia, Pa., a corporation of Pennsylvania Filed July 22, 1955, Ser. No. 523,773

4 Claims. (Cl. 145—61)

The present invention relates in general to hand tools, and more particularly to handles for percussive tools, such as hammers, hatchets, mauls, sledges, axes, picks and the like. The handle construction provided by the present invention is also applicable to tools other than those included specifically within the class designation of percussive tools, such as those wherein the handles are subject to occasional severe stress requiring high tensile, flexural and compressive strength in the tool handle.

Heretofore, it has been the prevalent practice in the trade to construct the handles for percussive tools such as hammers and the like from high grade hickory wood, which inherently has more desirable characteristics, particularly strength and resiliency, in this field than other woods which are obtainable. The continued use of hickory handles in percussive and other tools has been justified primarily because of the high strength of hickory relative to that of other woods, the good dynamic qualities provided in the final products when hickory handles are incorporated therein, and favorable economics of using this type wood. However, all woods, including hickory, are of obviously limited strength and are therefore subject to breakage under relatively low stresses.

To overcome these problems others have explored the use of forged steel handles for such tools. Such steel handles have been found to provide greater strength than hickory handles. However, because of the high density of steel, tools incorporating handles of this type have been found to have poor dynamic qualities as proper location of the centers of gravity and percussion cannot be obtained if other minimum practical design requirements are to be met.

The search for synthetic materials, particularly in the field of plastic compositions, to provide a better basic material than hickory wood or steel in handles of such percussive tools by which improved physical characteristics may be obtained, has been beset with many difficulties. The demanding requirements of high tensile and flexural strength in the eye and throat regions of the percussion tool handle, high compressive strength in the grip region of the handle, and high impact resistance throughout the handle require that any plastic composition employed in handles for percussive tools be reinforced, as the flexural strength characteristics of unreinforced plastics are not suitable to the conditions encountered in the use of percussive tools.

Polyester-type resins reinforced by glass fibers having considerably lower density than steel, which have heretofore been employed commercially in the production of so-called fiber-glass reinforced plastic products such as fishing rods, and the like, as a substitute for steel and bamboo, and which in such commercial applications possessed satisfactory physical strength characteristics, are available as a possible improved basic material for handles of percussion tools. However, resort to such a composition to produce a handle for such tools having the qualities considered to be necessary for a satisfactory percussion tool handle presents many obstacles.

Glass fibers are commercially sold in several forms which are available for use in the production of fiber-glass reinforced plastic compounds, the most common of which are chopped or milled strands of glass fibers which are disposed omnidirectionally so that the axes of the fibers extend in substantially all directions in the mass of chopped strands, fiber-glass roving which is a continuous filament of a preselected number of ends of glass fibers which are unidirectional with their axes all located parallel to each other and to the principal axis of the roving, fiber-glass matt which is formed of a strata of omnidirectional chopped strands bound together chemically, and woven cloth formed of glass fibers extending along perpendicular axes.

Tests have revealed that continuous glass fiber longitudinally oriented provide the flexural strength characteristics necessary for percussive tool handles. The use of unoriented chopped strands of fibrous glass alone as the reinforcing medium has been found to be unsatisfactory as this form of reinforcing does not produce the high tensile and compressive strength characteristics required for the type of loading found in such tools. The fiberglass mat and woven fiber-glass cloth are unsuitable as reinforcing media in such applications.

The selection of a fiber-glass reinforced plastic material which will be suitable for handles of percussive tools poses serious problems insofar as the achievement of the desired strength and dynamic qualities of the handle are concerned. The material employed for such handles must permit variation in cross section along the axis of the handle without disturbing the continuity of the fibers, or the flexural strength of the handle is reduced to a point where the handle cannot withstand the cantilever loading conditions encountered in normal use. Since solely longitudinally oriented fibers have little compressive strength in the direction of the axis of the handle, provision must be made for high impact strength in the handle butt section, since the butt of the hammer or other percussive tool would be frequently used for driving boards and the like, and since the handle must be protected against fracture when the tool is dropped. High compressive strength transverse to the longitudinal axis of the handle must also be provided to prevent fracture when the handle is used for prying or when subjected to other severe compressive loads.

The achievement of proper dynamic qualities is a highly important consideration, as the center of gravity location in the assembled tool must be in the throat region near the tool head at such a point as to place the center of percussion within the striking face of the tool head while the tool is in use. This is essential to the provision of a percussive tool which has the proper dynamic qualities and "heft" to permit effective and efficient use. Additionally, the shock dampening qualities of the fiber-glass reinforced plastic material must be adequate to prevent unpleasant transfer of shock to the hand of the user.

An object of the present invention, therefore, is the provision of a novel reinforced plastic tool handle having suitable characteristics for percussion tool applications.

Another object of the present invention is the provision of a fiber-glass reinforced molded resin percussion tool handle having a high tensile and flexural strength region, a high compression strength region, and a highly impact-resistant region, giving the handle appropriate characteristics for percussion tool uses.

Another object of the present invention is the provision of a fiber-glass reinforced polyester-type resin molded handle for percussion tools and the like wherein fiber-glass roving is embedded in the molded handle in a preselected orientation relative to the longitudinal axis of the handle to provide high flexural strength characteristics.

Another object of the present invention is the provision of a novel method of molding fiber-glass reinforced polyester-type resin handle for percussion tools and the like having unidirectional fiber-glass roving fibers uniformly embedded therein in parallelism with the longitudinal axis of the handle, whereby the fibers are maintained essentially uniformly distributed and unidirectionally oriented when the reinforced resin composition becomes fluid under the application of heat and pressure in a mold.

Another object of the present invention is the provision of a novel method of compression molding fiber-glass reinforced polyester-type resin handles for percussion tools and the like wherein the fiber orientation is maintained essentially unidirectional and resin-rich areas in the molded product are avoided.

Other objects, advantages and capabilities of the present invention will become apparent from the following detailed description, taken in conjunction with the accompanying drawing showing only one preferred embodiment of the invention.

In the drawings:

Figure 1 is an exploded perspective view of the sections of fiber-glass roving which are associated together to form the major portion of the mold charge in the production of a percussion tool handle in accordance with the present invention;

Figure 2 is a perspective view illustrating the manner in which the roving sections are associated together;

Figure 3 is a transverse section view taken along the line 3—3 of Figure 2;

Figure 4 is a top plan view of the assembled preform components of fiber-glass impregnated resin making up the complete mold charge in the production of one form of the present invention; and, Figure 5 is a top plan view of a molded percussion tool handle embodying the present invention, with parts of the handle shown in longitudinal section.

The invention will now be described in detail in connection with the production of a fiber-glass reinforced resin handle for hammers. The preform or charge which is to be placed in the mold and subjected to heat and pressure to produce the molded handle is produced from two types of material. The presence of the desired flexural strength characteristics in the final molded article is a product of the strict adherence to the hereafter described preparation and molding procedures for maintaining the required fiber orientation during the molding stage.

The major portion of the mold preform is formed from a continuous length of a suitable number of ends, preferably 60, 66 or 72, of roving type, unidirectional and parallel glass fibers or filaments.

The roving of continuous glass fibers is pulled through a bath of a styrenated, rigid thermosetting polyester resin to which has been added one percent by weight of a catalyst such as benzoyl peroxide and a suitable coloring agent to impart the desired color to the product, the glass fibers being thoroughly coated with this resin mix. To improve the surface characteristics of the molded product and minimize checking in the surface thereof, a small amount in the order of 5% of a suitable flexible polyester resin may be employed in the bath through which the roving is drawn. The roving of glass fibers is then passed through an orifice of predetermined size to strip excess accumulated resin from the glass fibers and thereby maintain the desired weight per unit of volume and a glass resin ratio of approximately 50 percent. The coated roving of glass fibers is then flattened in any desired manner to flatten the roving to a width of approximately 2⅛ inches and the flattened continuous roving is cut into sections 11¼ inches long and 6 inches long, respectively.

As illustrated in Figures 1 and 2, two 11¼-inch segments of flattened roving, indicated by the reference characters 10 and 11, and one 6-inch segment 12 of flattened roving comprise the elements of a mold preform 13 of this material. The first step in assembling the preform is to roll the 6-inch segment 12 of the flattened fiber-glass roving into a cylindroid 14 as indicated in Figures 2 and 3. This cylindroid 14 is then encased by wrapping the two 11¼-inch segments 10 and 11 around it in such a manner that the longitudinal marginal edges of the segments 10 and 11 overlap and completely surround the cylindroid 14 except for an approximately ¾-inch portion 15 of the inner cylindroid which protrudes from one end of the preform assembly. The entire preform assembly 13 thus formed by the cylindroid 14 and encasing roving segments 10 and 11 is then compressed and shaped manually so as to satisfactorily integrate its various components.

As an alternative arrangement, an insert of balsa wood or other compatible material of low specific weight may be substituted for the cylindroid 14 and encased between the roving segments 10 and 11, if desired, without materially altering the strength and dynamic qualities of the finished article.

By this arrangement, the parallel unidirectional glass fibers in the flattened roving sections 10, 11 and 12 are maintained in parallelism with each other and with the longitudinal axis of the tool handle in the mold preform so as to maintain the fiber orientation in the proper direction to insure the presence of the required high flexural strength characteristics and ability to withstand cantilever loading in the finished tool.

Before the mold is charged with the preform 13, there is added to the end of the preform 13 having the ¾-inch projection of the inner cylindroid 14 a mass constituting, in the preferred embodiment, approximately 52 grams of a special semiflexible reinforced resin mix, indicated generally by the reference character 16. This semirigid reinforced resin mix 16 is formed from a length of a suitable number of ends, generally 12 ends, of roving-type, continuous glass fibers or filaments which are coated by drawing the same through a bath of a mixture of styrenated polyester resins, consisting in the preferred embodiment of two parts of rigid resin and one part of flexible resin to which has been added one percent by weight of a catalyst such as benzoyl peroxide and a suitable coloring agent. The coated glass fibers are then chopped to approximately ¾-inch lengths in the preferred embodiment in such a manner that the disposition of the fibers throughout the mass of the combination of semirigid resin mix and glass fibers can be considered omnidirectional. The glass resin ratio of this mass 16 of reinforced resin is also approximately 50 percent.

The approximately 52-gram mass 16 of this semirigid reinforced resin mix is then compressed and shaped manually about the ¾-inch protuberance 15 of the inner 6-inch cylindroid 14 of continuous glass fibers so that the protuberance 15 forms a positioning and interlocking joint with the overlapping chopped fiber resin mix 16.

In the preferred embodiment, the 11¼-inch segments 10 and 11 of flattened fiber-glass roving and the ¾-inch protrusion 15 of the inner cylindroid 14 projecting from one end of the segments 10 and 11 produce a preformed component approximating 12 inches in length which, with the 52-gram mass 16 of chopped glass fibers and semirigid resin, yields a finally composed preform which fills the mold and produces a handle approximately 12⅜ inches in length.

Either before or after the mass 16 of chopped glass fibers and semirigid resin is applied to the end of the mold preform 13, the preform 13 in the form illustrated in Figure 2 or with the mass 16 applied thereto may be coated or dusted with a thin surface layer or stratum of glass fibers milled to a short length of approximately ¹⁄₁₆ inch applied as by rolling the preform in surface contact with a quantity of the milled fibers. This coating of milled fibers, indicated generally by the reference character 17, is for the purpose of absorbing excess resin which may flow from the components of the preform 13 during preform preparation and molding and thereby improve the surface characteristics of the product.

While preferred numbers of ends of roving have been indicated in the preferred examples herein described, the number of ends used in both the roving forming the segments 10, 11 and 12 and of the roving formed into the mass 16 of chopped fibers and semirigid resin can be readily varied, so long as the glass resin ratio is maintained at approximately the preferred percentages hereinbefore enumerated and sufficient over-all preform bulk is provided to insure adequate filling of the mold cavity. The glass resin ratio can, of course, be adjusted in such alternative situations by making suitable variations in the size of the orifice, through which the resin-loaded glass fibers are pulled to strip off excess resin.

From a practical standpoint, it is highly desirable that the particular polyester resins with which the glass fibers forming the segments 10, 11 and 12 and the chopped fiber mass 16 are formed, be selected from those commercially available resins which will produce reasonably non-tacky and dry masses for ease of handling during the preform preparation and molding operation.

To mold the hammer handle, a two-piece compression mold of the positive type consisting of a force and cavity with appropriate impressions is utilized. As previously described, the 52-gram mass 16 of chopped fibers and semirigid resin are manually formed about the protuberance 15 projecting from the preform 13 by the mold operator and the thus completed preform is then charged into the mold. The mold is heated by conventional means to a predetermined temperature, and is then closed under the conditions of pressure and time required by the characteristics of the materials making up the preform mold charge to permit shaping of the molded part and proper resin curing. The mold is then opened and the finished part is ejected from the mold by known means.

A positive type compression mold is preferred wherein the force is complementary to the cavity and the recessed molding face has inwardly inclined marginal walls to bulk the preform into the cavity chamber with minimum displacement of the mold charge between the vertical, parallel side walls of the force and cavity. This insures minimum disturbance of fiber orientation during molding and prevents floating of fibers away from the points of pressure. Wetting out of the reinforcing medium is improved and waste and scrap are minimized.

Compression molding with flash molds might be employed with a slight reduction in the excellence of the molded product, due to a greater displacement of fibers into the flashing which must be removed to produce a properly finished product, thereby rendering discontinuous the fibers having portions which floated into the flashing and diminishing the flexural strength of the product. Injection, transfer or plunger molding of any such glass fiber reinforced compositions to produce a tool handle by conventional molding techniques are unsatisfactory as a fracturing of the fibers takes place in connection with these molding techniques.

By forming the mold charge in the manner herein described, the glass fibers in the eye section 18, the throat section 19, and the grip section 20 of the handle are maintained unidirectionally oriented throughout the period when the resin composition is in a fluid state in the mold while heat and pressure are applied thereto, thereby retaining the fibers in approximate parallelism with the longitudinal axis of the handle. This orientation of the reinforcing glass fibers insures maximum flexural strength when the tool handle is subjected to the severe cantilever-type loading which occurs during use, for example when a nail is being extracted by means of the hammer claw.

In the above-described manner, a handle for percussive tools may be molded from fiber-glass reinforced plastic resins wherein a longitudinal variation in the cross section of the product may be achieved without disturbing the continuity of the reinforcing fibers, and the necessary flexural strength is preserved. This arrangement also provides sufficient compressive strength perpendicular to the longitudinal axis of the tool handle to prevent fracture of the tool handle under substantially all loads which might be anticipated in connection with use of such tools.

The low density of the glass fiber and resin mix permits the realization of a tool handle, particularly for hammers, wherein the center of gravity of the assembled tool may be disposed in such a location in the throat region near the tool head as to place the center of percussion within the striking face of the tool head. The inherent characteristics of this composition provide the desired shock dampening qualities for such tools. This composition, therefore, permits the incorporation in such tools of substantially all the desirable dynamic qualities formerly associated with hickory handles.

The reinforced mass of part-flexible and part-rigid-type resin 16 having embedded chopped glass fibers therein is to provide the desired high impact resistance characteristics in hammer handles so as to afford maximum resistance to breakage in the event that the hammer and handle assembly should fall from an elevation in a manner that the handle butt is initially struck upon impact or in the event the handle assembly is subject to some similar type impact in this region.

The advantageous characteristics of high flexural strength, including high tensile strength in the eye and throat portions 18 and 19, high compressive strength in the grip region 20 and high impact resistance in the butt portion of the handle produced by the orientation and association of the reinforcing glass fibers in the manner hereinabove described, also render this construction of reinforced plastic handles appropriate for the wood or steel handles in other types of percussive tools such as axes, sledges, picks, mauls, and like tool falling within this class designation.

While only one preferred embodiment of the invention has been particularly shown and described, it is apparent that other various modifications may be made in the invention without departing from the spirit and scope thereof, and it is desired, therefore, that only such limitations shall be placed thereon as are imposed by the prior art and are set forth in the appended claims.

We claim:

1. An elongated handle for hammers and like percussive tools molded into an integral body of varying cross section longitudinally thereof in a compression mold under heat and pressure and having an end portion adapted to be inserted into a tool head eye, a throat portion, a grip portion, and a butt portion remote from said end portion, said portions being aligned longitudinally of the handle, said end, throat and grip portions consisting of a substantially rigid thermosetting polyester resin reinforced with glass fiber roving having the fibers thereof all oriented substantially parallel to the longitudinal axis of the handle, and said butt portion being formed of a mass of a mixture of rigid and flexible thermosetting polyester resins reinforced with omnidirectional short glass fibers distributed substantially uniformly throughout said mass.

2. An elongated handle for hammers and like percussive tools molded into an integral body of varying cross section longitudinally thereof in a compression mold under heat and pressure and having an end portion adapted to be inserted into a tool head eye, a throat portion, a grip portion, and a butt portion remote from said end portion, said portions being aligned longitudinally of the handle, said end, throat and grip portions consisting of a substantially rigid thermosetting polyester resin reinforced with glass fiber roving having the fibers thereof all oriented substantially parallel to the longitudinal axis of the handle to provide high flexural strength including high tensile strength in said end and throat portions and high compressive strength in said grip portion, and said butt portion being formed of a mass of a mixture of rigid and flexible thermosetting polyester resins reinforced with omnidirectional short glass fibers distributed substantially uniformly throughout said mass to provide high impact resistance and high omnidirectional compressive strength throughout said butt portion.

3. An elongated handle for hammers and like percussive tools which is an integral body having an end portion adapted to be inserted into a tool head eye, a throat portion, a grip portion, and a butt portion remote from said end portion, said portions being aligned longitudinally of the handle, said end, throat and grip portions consisting of a substantially rigid thermosetting resin reinforced with glass fiber roving having the fibers thereof all oriented substantially parallel to the longitudinal axis of the handle, and said butt portion being formed of a mass of a mixture of rigid and flexible thermosetting resins reinforced with omnidirectional short glass fibers distributed substantially uniformly throughout said mass.

4. An elongated handle for hammers and like percussive tools which is an integral body having an end portion adapted to be inserted into a tool head eye, a throat portion, a grip portion, and a butt portion remote from said end portion, said portions being aligned longitudinally of the handle, said end, throat and grip portions essentially comprising a substantially rigid thermosetting resin reinforced with glass fiber roving having the fibers thereof all oriented substantially parallel to the longitudinal axis of the handle, and said butt portion being formed of a mass of a mixture of rigid and flexible thermosetting resins reinforced with omnidirectional short glass fibers distributed substantially uniformly throughout said mass.

References Cited in the file of this patent

UNITED STATES PATENTS

| | | |
|---|---|---|
| 376,413 | Millspaugh | Jan. 10, 1888 |
| 1,323,039 | Frederick | Nov. 25, 1919 |
| 1,375,069 | Turgeon | Apr. 19, 1921 |
| 2,086,083 | Jeffress | July 6, 1937 |
| 2,571,717 | Howald et al. | Oct. 16, 1951 |
| 2,602,766 | Francis | July 8, 1952 |
| 2,621,140 | Bitterhi et al. | Dec. 9, 1952 |
| 2,684,318 | Meek | July 20, 1954 |